United States Patent [19]
Gough et al.

[11] Patent Number: 5,799,239
[45] Date of Patent: Aug. 25, 1998

[54] ASYMMETRIC COUPLING METHOD FOR ATTENUATING UPSTREAM AND DOWNSTREAM SIGNALS BY DIFFERENT AMOUNTS TO REDUCE INGRESS NOISE

[75] Inventors: Cameron Gough, Hackettstown, N.J.; Isaac E. Morgan, Stone Mountain, Ga.

[73] Assignee: AT&T Corp, Middletown, N.J.

[21] Appl. No.: 703,290

[22] Filed: Aug. 26, 1996

[51] Int. Cl.$^6$ .............................. H04H 1/00; H04N 7/173
[52] U.S. Cl. .............................. 455/5.1; 348/12; 348/13
[58] Field of Search .......................... 348/7, 12, 13; 455/5.1, 4.2, 6.1, 6.2; 370/488, 486; H04N 7/173

[56] References Cited

U.S. PATENT DOCUMENTS 4,920,533  4/1990  Dufresne .................................. 348/12

Primary Examiner—Sherrie Hsia
Attorney, Agent, or Firm—Robert B. Levy

[57] ABSTRACT

Downstream and upstream signals in a transmission system are attenuated by different amounts to allow upstream signals to be originated at individual subscribers (22—22, 30—30) at the same level yet be received at a common upstream amplifier (19b) at substantially the same level. Different attenuation of downstream and upstream signals is achieved by the combination of a pair of directional couplers (110a and 110b) and a diplex filter (132). The couplers and diplex filter collectively separate a downstream signal destined for the subscriber from an upstream signal generated by the subscriber. The upstream signal which is separated may be attenuated by a matching loss element (138) to attenuate the upstream signal by an amount greater or less than the downstream signal.

5 Claims, 1 Drawing Sheet

ASYMMETRIC COUPLING METHOD FOR ATTENUATING UPSTREAM AND DOWNSTREAM SIGNALS BY DIFFERENT AMOUNTS TO REDUCE INGRESS NOISE

TECHNICAL FIELD

This invention relates to a technique for attenuating downstream and upstream signals in a transmission system by different weights to reduce ingress noise.

BACKGROUND ART

In present day hybrid fiber-coax transmission systems, a downstream signal destined for individual subscribers originates at a head end. From the head end, the downstream signal is typically optically formatted for transmission over a fiber optic link to a fiber node. At the fiber node, the downstream signal is converted to an electrical signal. A coaxial cable network (plant) transmits the electrical signal to the individual subscribers and carries upstream electrical signals from the subscribers to the fiber node for optical formatting for ultimate delivery to the head end.

Within the coaxial cable plant, the downstream electrical signal is distributed via one or more coaxial trunks. Each trunk usually has at least one trunk amplifier for amplifying the downstream signal on the trunk. Also, each trunk may have at least one directional coupler having a through leg and a down leg for dividing the trunk to feed additional amplifiers on each leg. Further, each trunk may be divided into separate branches. Each branch may include at least one line amplifier for amplifying the downstream signal on that branch. Additionally, each branch may include at least one directional coupler having a through leg and a down leg for feeding additional amplifiers or taps that serve individual subscribers. Subscriber-generated upstream signals, received at a coupler down leg via a subscriber tap, pass through the coupler on its through leg for injection onto the branch. By the same token, upstream signals may also be received at a second coupler through port for passage to its first through port via the coupler through leg for injection onto the branch. Typically, a separate upstream amplifier is present within each line amplifier for amplifying the subscriber-generated upstream signals injected onto the branch. Upstream amplifiers may also be present in each trunk amplifier as well.

Present day couplers generally exhibit a relatively low loss (e.g., <3 dB) along their through leg running between the first and second through ports for signals within the 5–750 MHz frequency band. Downstream signals passing along the down leg from the first through port, and upstream signals passing along the down leg to the first through port of the coupler are typically attenuated by a much greater value. Presently, directional couplers attenuate upstream and downstream signals passing along the coupler down leg to/from the first through port by either 8, 12 or 16 dB depending on the coupler design. Except for variations in frequency, the upstream and downstream signals passing along the coupler down leg to/from the first through port are attenuated by the same amount.

To achieve an adequate and approximately equal power level at separate subscriber premises, the level of attenuation provided by each tap is selected to obtain approximately the same downstream loss at all subscribers taps. Hence, the attenuation weights must decrease in accordance with the distance the downstream signal traverses from the downstream line amplifier because of increasing cable losses plus the decreased power level caused by the energy siphoned off at previous taps and directional couplers if present. Equal losses, and therefore, equal received power levels for individual premises assures a sufficiently high signal to overcome any noise that may be present at each premises.

Just as it is desirable to achieve a uniform signal level for downstream signals at the subscriber premises, it is also desirable to achieve a uniform level for upstream signals received at each common upstream amplifier in the cable plant. Since the attenuation weights associated with the taps and directional couplers are presently fixed, the level of signals emanating from the Customer Premises Equipment (CPE) at each premises must be varied to assure that the upstream signals all have approximately the same level at each common upstream amplifier. Hence, the subscriber premises closest to the common upstream amplifier must have the highest CPE output level to compensate for the highest combined coupler and/or tap attenuation value. Conversely, the subscriber premises furthest from the upstream amplifier generally will have the lowest signal level.

The symmetric upstream and downstream loss provided by present day taps and couplers makes it almost impossible to achieve a uniform upstream signal level at each common upstream amplifier when the level of upstream CPE signals from the subscribers' premises is maintained substantially constant. As a result, the CPE signal levels must be varied, causing degradation in network performance due to increased levels of ingress noise.

Thus, there is a need for a technique for reducing ingress noise in a hybrid fiber-coax system.

BRIEF SUMMARY OF THE INVENTION

Briefly, in accordance with a preferred embodiment of the invention, a method is provided for attenuating downstream signals, such as those destined for subscribers in a hybrid fiber-coax or all coax transmission system, by an amount different from upstream signals generated by such subscribers. Downstream signals emanating from a port, such as the output of a line amplifier, pass along a first path (typically, a through leg running between first and second through ports of a first directional coupler) and through a second path having an attenuation factor higher than that of the first path. In practice, the second path comprises the down leg of a second coupler having a through leg running between a first and second through ports. (In practice, the through leg of each coupler has a lower loss than its down leg.) From the second path, the downstream signals pass to an output port via a first path of a diplex filter that separates downstream signals along the first filter path from upstream signals that pass along on a second filter path. The upstream signals pass along the second path of the diplex filter. Such signals are attenuated, typically via a matching loss element, and a down leg of the first coupler, by an amount different from the attenuation factor of the second path.. Upstream signals may also be received at the second coupler and will pass through the second coupler via its through leg and thereafter pass along the through leg of the first coupler. The upstream passing through the first and second couplers in this fashion will be attenuated by a different amount than the upstream signals passing through the matching loss element and along the down leg of the first coupler.

Attenuating the downstream and upstream signals by different amounts allows upstream signals generated by Customer Premises Equipment (CPE) at different subscriber premises all to be maintained at a substantially constant level while maintaining near constant CPE levels at a common upstream amplifier. In this way, the signal level from a distant subscriber can be maintained at a high level to reduce the effects of ingress noise.

DETAILED DESCRIPTION

Figure 1:
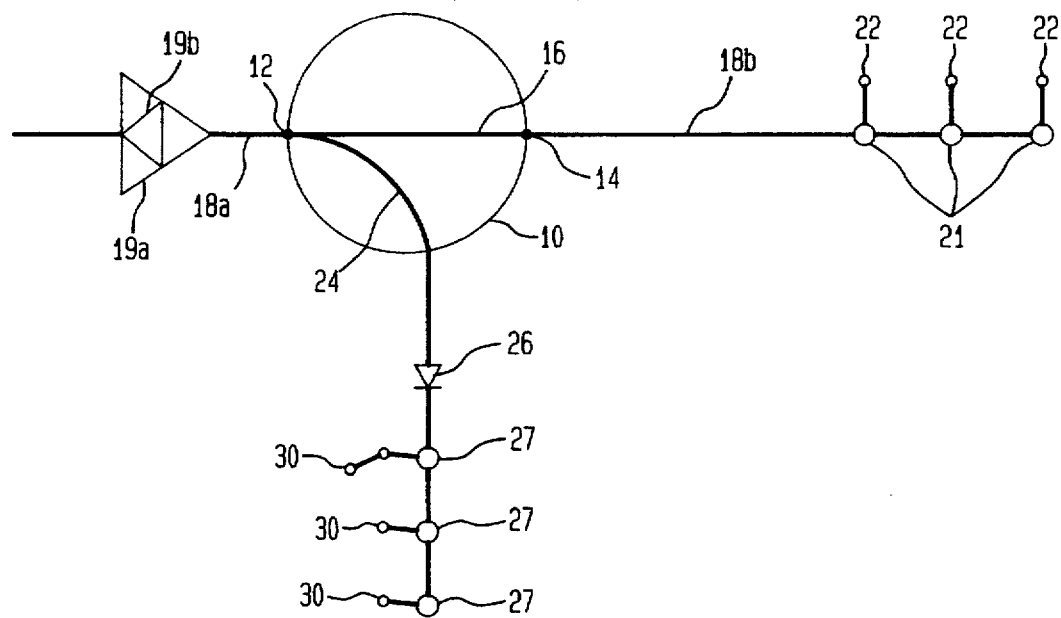
FIG. 1 is a block diagram of a directional coupler in accordance with the prior art.

FIG. 1, depicts a prior art directional coupler 10 having a first and second through ports 12 and 14 connected by a first path (through leg) 16 having a relatively low loss (e.g., <3 dB). In practice, the first through port 12 is coupled to an upstream cable 18a, either a branch or trunk in a coaxial cable network, that carries downstream signals within the 50-750 MHz frequency band from a downstream amplifier 19a. The second through port 14 is typically connected to a downstream cable 18b for supplying the downstream signal to one or more taps 21—21, each serving at least one subscriber 22.

The coupler 10 includes a down leg 24 coupled to the first port 12 for diverting a portion of the downstream signal onto a branch 26. One or more taps 27—27, each similar to tap 21, are disposed along the branch 26, each tap serving at least one subscriber 30.. Usually, the down leg 24 has an attenuation factor greater than that of the first path 16. Present day couplers are manufactured such that the down leg 24 has an attenuation factor of 8, 12 or 16 dB although other values are possible. To achieve an adequate power level for the subscribers 22—22, and the subscribers 30—30, the level of attenuation provided by the coupler 10 through its down leg 24 is selected so that the attenuation of the signal passing along the down leg differs from the attenuation of the signal passing along the path 16 between through ports 12 and 14.

The subscribers 30—30 not only each receive a downstream signal but may originate an upstream signal for transmission, via the branch 26 and the down leg 24 of the coupler 10, to through port 12 for transmission via the cable 18a to an upstream amplifier 19b. (By the same token, the subscribers 22—22 also may each originate an upstream signal for passage to the upstream amplifier 19b via the cable 18b, the path 16 and the cable 18a)

As may be appreciated, the upstream signal originating from each subscriber 30 will be attenuated by the down leg 24 of the coupler 10 by the same amount as the downstream signal supplied to that subscriber. By the same token, the upstream signals originated by the subscribers 22—22 are attenuated by the path 16 to the same extent as the downstream signals. The symmetric attenuation provided by the down leg 24 generally makes it impossible to set the upstream signals originated at each of the subscribers 22—22 and 30—30 all at the same level, yet achieve a substantially constant subscriber signal level at the common upstream amplifier 19b.

Figure 2:
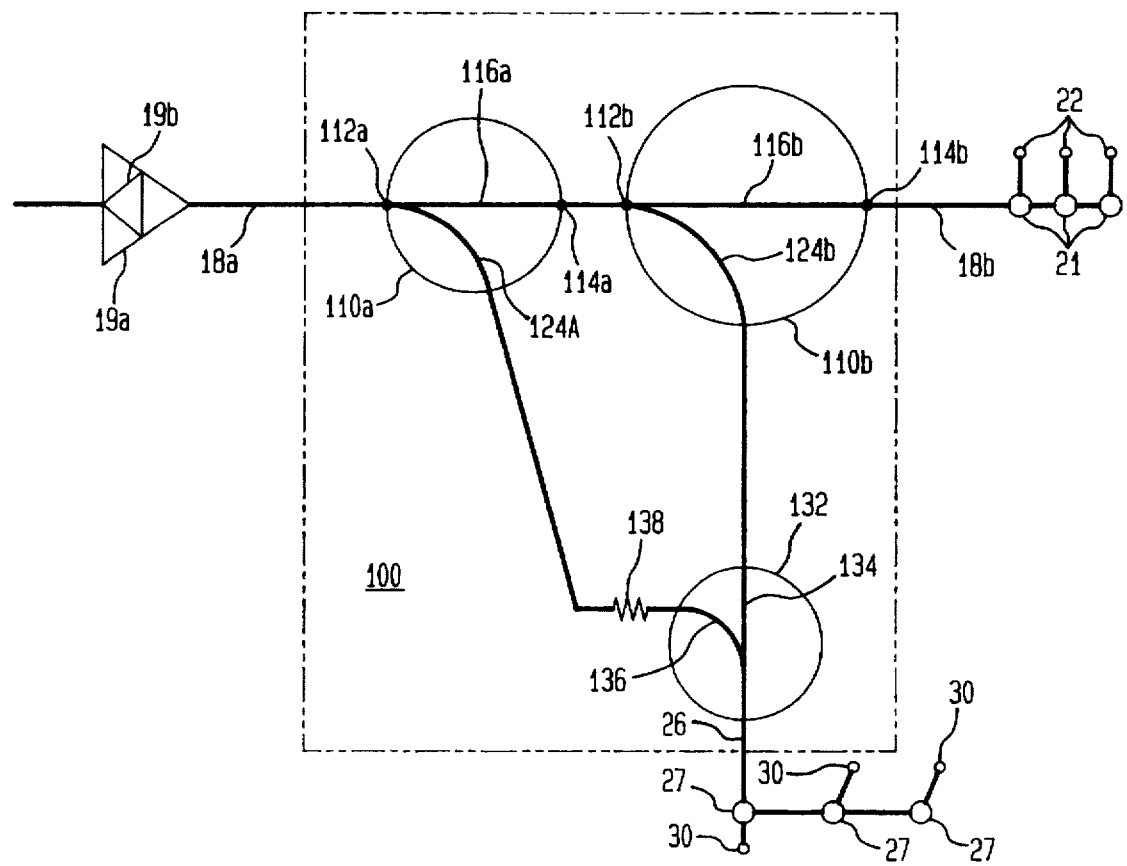
FIG. 2 is a block diagram of a directional coupler mechanism in accordance with the present invention.

FIG. 2 depicts a directional coupler 100 in accordance with a preferred embodiment of the present invention for attenuating downstream and upstream signals by different amounts. This allows upstream signals to be originated by the subscribers 22—22 and 30—30 at a prescribed (maximum) level while maintaining the level of the subscriber-originated upstream signals received at the common upstream amplifier 19b substantially constant.

The coupler mechanism 100 of FIG. 2 comprises a first coupler 110a having a first and second through ports 112a and 114a connected by a path (through leg ) 116a having a relatively low loss (e.g., <1 dB). The coupler 110a has a down leg 124a coupled to the first through port 112a. The down leg 124a of the coupler 110a is frequently selective to pass only upstream signals.

In addition to the coupler 110a, the coupling mechanism 110 of FIG. 2 includes a second coupler 110b having a first and second through ports 112b and 114b connected by a path (though leg) 116b having a relatively low loss (e.g., <3 dB). The coupler 110b has a down leg 124b coupled to the first through port 112b, the down leg having an attenuation greater than that of the path 116b, typically 8, 12 or 16 dB.

The first through port 112b of the coupler 110b is connected to the second through port 114a of the coupler 110a. In this way, a downstream signal emanating from downstream amplifier 19a passes via the upstream cable 18a and along the paths 116a and 116b in the couplers 110a and 110b, respectively From the coupler 110b, a major portion of the downstream signal passes on the cable 18b for distribution to subscribers 22—22 via taps 21—21. A small portion of the downstream signal will be drawn off by the down leg 124b of the coupler 110b. Conversely, upstream signals originating from the subscribers 22—22 pass via cable 18b, and along the paths 116b and 116a in the couplers 110b and 110a, respectively, to the upstream amplifier 19b via a cable 18a.

In addition to the couplers 110a and 110b, the coupling mechanism 100 of FIG. 2 includes a diplex filter 132 having a high frequency path 134 coupled between the down leg 124b of the coupler 110b and the branch 26 that serves subscribers 30—30 via the taps 27—27. The diplex filter 132 also has a low frequency path 136 coupled via a matching loss element 138 to the down leg 124a of the coupler 110a.

In operation, a downstream signal emanating from the downstream amplifier 19a passes via the cable 18a into the coupler 110a. The downstream signal then passes along the path 116a of the coupler 110a and into the coupler 110b where a portion of the downstream signal is drawn off through the down leg 124b for passage to the diplex filter 132. The diplex filter 132 passes the downstream signal, which is typically within the frequency range of 50-750 MHz, along the high frequency path 134 to the subscribers 30—30. (Virtually none of the downstream signal passes via the down leg 124a, the loss element 138 and the low frequency path 136 because the downstream signal lies above the frequency band (e.g., 5-45 MHz) of signals passed by the low frequency path of the diplex filter 132.

Subscriber-originated upstream signals within the 5-45 MHz frequency band that are received at the diplex filter 132 pass via the low frequency path 136 of the filter into the matching loss element 138 for passage to the down leg 124a of the coupler 110a. The upstream signals pass along the cable 18a to the upstream amplifier 19b. Virtually none of the upstream signals in the 5-45 MHz band pass along the high frequency path 134 of the diplex filter 132 because such signals lie below the band pass region of this path.

As may now be appreciated, the downstream signal and upstream signals travel different paths having different attenuations. By varying the attenuation factor of the loss element 138, the upstream signals may be attenuated by an amount greater than of less than the downstream signals. Moreover, the attenuation of upstream signals generated by the subscribers 22—22 will also differ from the attenuation of the upstream signals generated by the subscribers 30—30 By varying the attenuation factor of the matching loss element 138 (assuming all other attenuations remain fixed), the attenuation provided by the coupling mechanism 100 for upstream signals originating from the subscribers 30—30 can be made greater, equal to, or less than the attenuation of the upstream signals from the subscribers 22—22. For example, the upstream attenuation of the coupling mechanism 100 can be adjusted such that the upstream signals received from the subscribers 22—22 and 30—30 yield nearly equal level signals at the common upstream amplifier 19b when the subscribers generate approximately equal level CPE signals.

The foregoing describes a technique for attenuating downstream and upstream signals by different amounts.

It is to be understood that the above-described embodiments are merely illustrative of the principles of the invention. Various modifications and changes may be made thereto by those skilled in the art which will embody the principles of the invention and fall within the spirit and scope thereof. For example, while the upstream signals have been described as lying within the 5–45 MHz bandwidth, the bandwidth may in fact have a higher upper limit. Indeed, it may be desirable for all or at least a portion of the upstream signals to be modulated via a carrier onto a frequency band above that of the downstream signals.

What is claimed is:

1. An asymmetric coupling method for attenuating downstream signals by a different attenuation value from upstream signals, comprising the steps of:

diverting a portion of a downstream signal present on a transmission line onto a first diversion path;

passing the diverted portion of the downstream signal on the first diversion path to at an output port through a first path of a diplex filter that separates the downstream signals on the first path from the upstream signals received on a second path;

passing the upstream signals received on the second path of the diplex filter through a matching loss element; and transmitting the upstream signals received from the matching loss element through a second diversion path onto the transmission line, wherein the collective attenuation of the downstream signal along the first diversion path and the first path of the diplex filter being different than the collective attenuation of the upstream signal along the second path of the diplex filter, the matching loss element and the second diversion path.

2. The method according to claim 1 wherein the downstream signal pass from a head end to individual subscribers.

3. The method according to claim 1 wherein the upstream signals pass from individual subscribers to a head end.

4. The method according to claim 1 wherein the upstream signals are attenuated by an amount greater than the downstream signals.

5. The method according to claim 1 wherein the upstream signals are attenuated by an amount less than the downstream signals.

* * * * *